Sept. 18, 1934.  L. E. BROWN  1,973,744
RELIEF VALVE
Filed Nov. 21, 1933
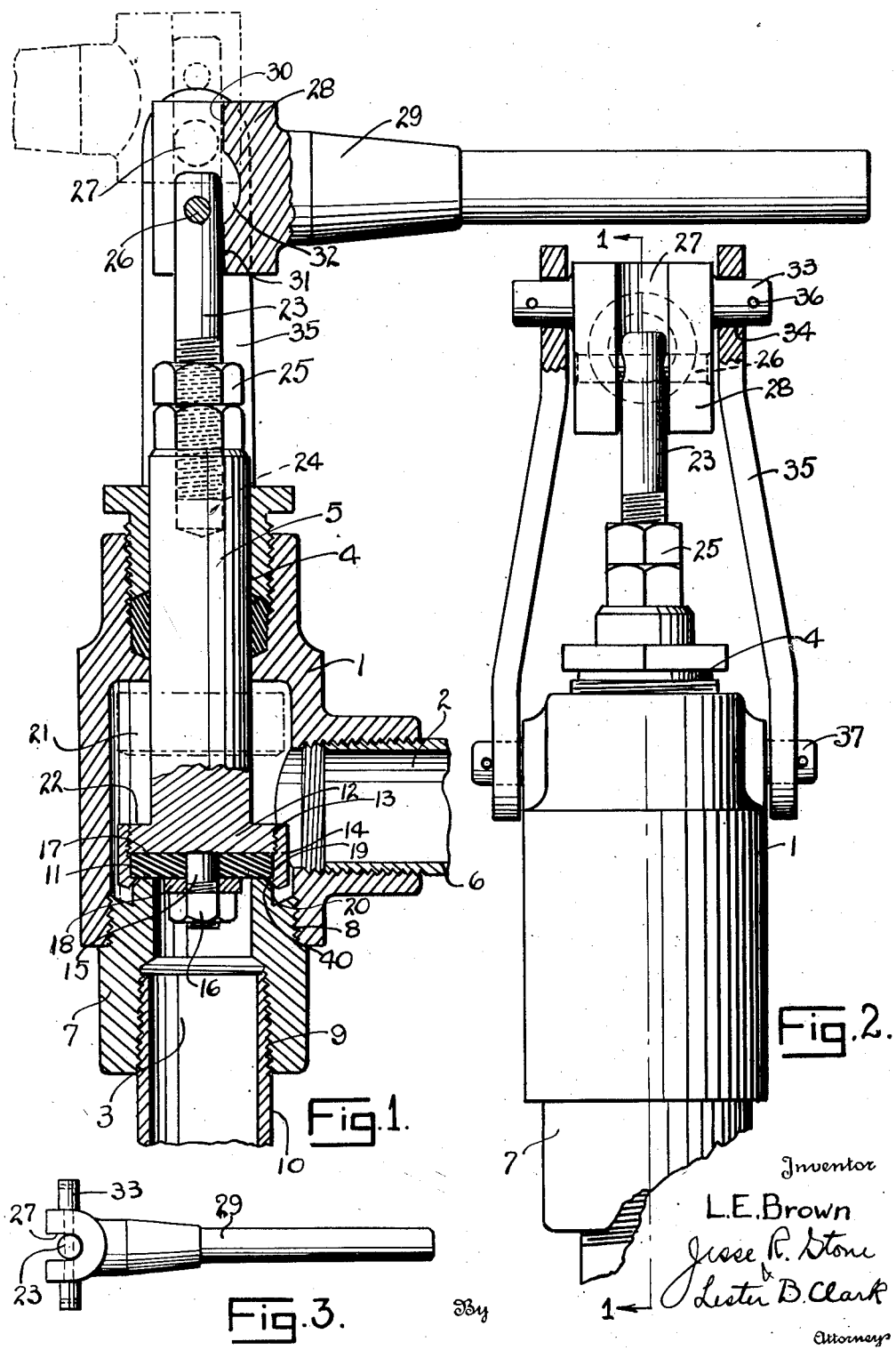

Patented Sept. 18, 1934

1,973,744

UNITED STATES PATENT OFFICE 1,973,744

RELIEF VALVE

Luther E. Brown, Kilgore, Tex.

Application November 21, 1933, Serial No. 698,955

5 Claims. (Cl. 251—41)

My invention relates to relief valves of the angle type adapted for rapid opening and closing.

It is an object of the invention to provide a relief valve of simple construction which may be assembled and disassembled easily, giving access to the valve for repair or replacement.

It is another object of the invention to provide a valve of comparatively large diameter but which is adapted to be easily opened and closed because of the small area above the valve upon which pressure may be exerted.

It is another object to provide an angle valve which is constructed to be opened and closed by the action of a lever, said lever acting to hold the valve in open and closed position and arranged to contact with the stem of the valve to limit the movement of the handle in its opening or closing movement.

The invention also includes the construction of a valve head in which the gasket is held effectively in position and in which a seal may be obtained both by contact of the sealing gasket with the valve seat or by the clamping member which holds the gasket in position.

The invention further contemplates the use of a valve stem which may be adjusted as to length so as to arrange for the adjustment of the valve relative to the seat without disassembling the valve.

These and other objects are accomplished through the construction which will be later described and which is disclosed in the drawing herewith wherein:

Fig. 1 is a central longitudinal section through a valve embodying my invention, some portions of the structure being shown in elevation.

Fig. 2 is a front elevation of a valve showing the manner in which the valve is operated.

Fig. 3 is a top plan view of the lever forming the handle employed in operating the valve.

In the construction of my valve I form a housing 1 of approximately T shape with an inlet 2 at one side and an outlet 3 at right angles to the inlet. Opposite the inlet is a stuffing box 4 through which the valve stem 5 is slidable.

The inlet is adapted to be connected with a flow pipe 6 in the usual manner.

In the outlet is a nipple 7, which is reduced in diameter and threaded for attachment at 8 to the body of the housing 1. Said nipple projects below the housing and is threaded at its lower end for connection at 9 with the outlet pipe 10. The upper end of the nipple 7 is still further reduced in diameter and formed into a valve seat which has a plane inner end or upper face 11 beveled on its outer side at 40.

The valve stem 5 is of comparatively large diameter and has at its lower end a head 12, which is threaded on its outer periphery at 13 to receive a clamping collar 14. Centrally of the head 12 is an axial post 15, which projects downwardly a suitable distance and is threaded to receive a nut 16.

The valve head is formed to receive a flat sealing gasket 17 on its lower face, said gasket having a central opening to fit about the post 15 and to be clamped in position by a washer or ring 18 clamped thereon by means of the nut 16.

The collar 14 is formed at its lower end with a short inward projection or flange 19, which is adapted to engage the lower margin of the packing gasket 17 and to assist in holding the gasket rigidly in position. The lower inner margin of the collar is beveled at 20 to engage the beveled area 40 upon the valve seat. It is to be noted, however, that when the valve is closed the sealing gasket 17 will contact with the upper plane area 11 with the beveled area 20 of the collar spaced slightly from the seat. However, if it is ascertained that the sealing gasket is not maintaining the desired seal, it is possible to adjust the valve head 12 so that it may be moved further downwardly to bring the beveled area 20 to contact with the seat and thus not only compress the sealing gasket but to obtain a metal seal also.

The head of the valve moves within a chamber 21 in the housing and, because of the comparatively large size of the valve stem 5, the upper area of the valve head, which is exposed to the fluid pressure, is comparatively small so that the raising of the valve from its seat is greatly facilitated. The upper end of the valve stem 5 is itself exposed to the atmosphere and will not interfere with the movement of the valve.

The valve stem is connected to an upper detachable section 23 by engagement of said section within a threaded socket 24 in the stem. It will be noted that the upper section 23 is adjustable vertically within the socket 24 and may be locked in adjusted position by lock nuts 25.

The upper end of the valve stem, including the section 23, is pivoted upon a pin 26 extending transversely across a U-shaped socket 27, in the head 28 of the operating lever 29. It will be noted that the U-shaped socket 27 has its closed side, indicated at 30, arranged to bear against the side of the stem 23, and limit the downward swinging of the handle by contact at 31 with said stem. Midway between the ends of the socket I provide a recess 32 to allow for the upper end of the valve stem when the handle is swung to move the stem.

On opposite sides of the yoke or socket 27 are laterally projecting trunnions 33, which are arranged to be engaged within openings 34 in the upper ends of links 35. The said links may be held in position engaging over said trunnions by means of cotter pins 36.

The links 35 are arranged to spread slightly apart on their lower ends and have openings in said lower ends to engage over trunnions 37 upon the upper portion of the housing 1. With this support it will be obvious that the upper end of the lever is free to be swung from one side, as shown in full lines in Fig. 1, over to an opposite position, as shown in dotted lines, thus moving from a closed position of the valve to an open position thereof and in which the weight of the operating lever tends to hold the valve in either the open or the closed position.

This movement of the handle will raise or lower the valve stem due to the fact that the pivot pin 26, which connects the handle with the valve stem, is spaced at a point below the trunnions 33 when the valve is in closed position and above said trunnions when the valve is in open position.

The arrangement whereby the yoke or socket 27 is adapted to engage the valve stem section 23, so as to limit the opening or closing movement of the lever, is of material importance as the handle is always maintained in an approximately horizontal position where it may be quickly engaged to operate the valve without difficulty and to obtain the greatest benefit of the weight of the handle to hold the valve in the desired position.

The operation of my valve will be obvious from the description already given. When it is desired to release the pressure the valve may be easily and quickly opened by swinging the handle 29 from one horizontal position to the opposite horizontal position. In the closing of the valve the same movement in a reverse direction will quickly throw the lever into position to close the valve.

The construction of the valve to assure an effective seal has been found to be exceptionally efficient. Normally the sealing gasket is arranged to be forced against the plane upper surface of the seat with sufficient force to maintain a seal. At times, however, it is necessary to force the valve down with great force and this may be done by lengthening the valve stem by adjustment of the upper section with the lower section of the stem, and then forcing the valve downwardly to bring the lower edge of the clamping collar 14 against the metal of the seat. By this means I am enabled to seal off all pressures which are normally encountered where such valves are used.

It is also to be noted that access may be easily had to the interior of the valve by unscrewing the nipple 7. This not only exposes the valve seat but allows ready access to the valve which may be removed through this opening or which may be re-packed without removal. This makes the servicing of this valve exceptionally convenient and quickly accomplished. The further advantages will be obvious to those skilled in the art.

What is claimed as new is:

1. A valve including a housing, a lateral inlet therein, an outlet at right angles to said inlet, a nipple screwed within said outlet, a valve seat presented inwardly on said nipple, a stuffing box opposite said outlet, a valve stem slidable through said stuffing box, a head on said stem, a sealing gasket on the inner end of said head, means to retain said gasket on said head, a collar having a threaded engagement with said head, an inner flange on said collar engaging said gasket, said gasket and collar being adapted to engage said seat, said collar being normally spaced slightly from said seat, and means to move said valve stem.

2. An angle valve including a housing, an inlet and an outlet at right angles to said inlet, a nipple screwed within the outlet end of said housing, said nipple forming a valve seat, a valve stem of comparatively large diameter slidable in said housing, a packing gasket secured to the inner end of said stem, a collar threaded upon said stem and adapted to engage and clamp said gasket in position on said head, said gasket being adapted to engage the inner end of said seat, said collar being adapted to engage the outer side of said seat when said valve is moved to closed position, and means to move said valve.

3. An angle valve including a housing, a seat therein at one end, a valve stem slidable through the end of said housing opposite said seat, a valve on said stem adapted to engage said seat, a lever, a swinging support for said lever, a yoke on said lever having a pivotal engagement with said stem, said valve stem being moved to and from its seat by the swinging of said lever from one horizontal position to an opposite horizontal position, and means on said yoke engaging said stem to limit the swinging movement of said lever in either direction.

4. An angle valve including a housing, a seat therein, a valve stem movable in said housing to and from said seat, sealing means on said valve stem adapted to engage said seat, a lever, a yoke thereon, outwardly extending trunnions on said yoke, a support for said trunnions on said housing, a pivotal connection between said stem and said yoke offset from said trunnions whereby the swinging of said lever will raise or lower said valve and means on said yoke for engaging said stem to limit the movement of said lever to a horizontal position when said lever is in either open or closed position.

5. A valve including a tubular housing, a valve seat at one end thereof, a valve stem movable through the opposite end thereof, a head on said stem within said housing, a sealing gasket on the inner end of said head, means to hold said gasket on said head, a clamping collar adjustably secured on said head, a flange on said collar adapted to engage the margin of said gasket, the lower edge of said collar forming a seat engaging member adapted when said valve is closed to engage said seat, and means to move said valve stem and valve slidably in said housing.

LUTHER E. BROWN.